June 30, 1931.     J. S. JUDELL     1,811,852
STRAINER
Filed Nov. 3, 1928

Inventor
J. S. Judell
by W. H. Lieber
Attorney

Patented June 30, 1931

1,811,852

UNITED STATES PATENT OFFICE

JULIUS S. JUDELL, OF SHOREWOOD, WISCONSIN, ASSIGNOR TO MILWAUKEE FLUSH VALVE COMPANY, OF MILWAUKEE, WISCONSIN, A CORPORATION OF WISCONSIN

STRAINER

Application filed November 3, 1928. Serial No. 316,928.

The present invention relates in general to improvements in the construction of strainers for kitchen sinks or the like.

An object of the invention is to provide a new and useful combination strainer and flow control plug or stopper, which possesses numerous advantages over similar devices of the prior art.

It has heretofore been proposed to utilize a combined strainer receptacle and stopper for kitchen sinks, wherein the strainer receptacle which is loosely disposed within a pocket near the sink outlet, has the flow control stopper rigidly attached to the discharge side of the receptacle, so that it is necessary to move the strainer in order to manipulate the stopper. As the strainer receptacle serves to accumulate solids which might tend to clog the waste pipe if permitted to pass therethrough, and since the receptacle has but limited holding capacity, it is desirable at times to bodily remove the receptacle together with the stopper, for cleaning purposes. Due to the fact that both the strainer receptacle and the stopper must be moved while adjusting the stopper in the devices of the prior art, the operator's fingers must be inserted into the accumulated garbage or other solids within the strainer receptacle when raising the strainer and stopper to open the outlet, and the accumulated solids are apt to overflow into the sink when the receptacle is lifted with the stopper while making the adjustment. The fact that the strainer receptacle must be raised with the stopper when opening the latter in the prior art devices, also necessitates provision of a relatively deep pocket for normally confining the strainer and stopper, as it is undesirable to have the strainer receptacle project above the bottom of the sink when the liquid is being drawn off. In some of the prior devices, it was also necessary to provide lugs on the inner side wall of the pocket and corresponding notches in the strainer receptacle, for holding the strainer and stopper in elevated position when the outlet is open and for permitting closing of the stopper, thereby placing obstructions in the path of the flowing liquid, and providing a relatively difficult and costly construction to manufacture.

It is a more specific object of the present invention to provide an improved strainer of the receptacle type wherein the removable strainer receptacle through which the liquid flows prior to reaching the stopper controlled outlet, need not be moved or otherwise disturbed while manipulating the stopper. With the present improvement, all of the previously mentioned objectionable features of the prior devices of this particular type, are entirely eliminated while the desirable features thereof are retained. The improved stopper which is preferably located and concealed beneath the strainer receptacle, is operable without reaching deep into a pocket filled with garbage, and a relatively shallow pocket and strainer receptacle may be utilized without undesirably reducing the holding capacity of the latter. The improved strainer receptacle, as well as the improved confining pocket, are devoid of objectionable internal lugs and projections, the stopper and strainer however, being freely simultaneously removable for cleaning as in the prior devices. The improvement while being confined to the type of strainer mechanism wherein a receptacle form of strainer is utilized in advance of the flow controlling valve or stopper so as to catch and accumulate all of the objectionable solids before they reach the stopper controlled outlet without permitting refuse to accumulate beyond the normal bottom of the basin with which the device is associated, is not necessarily confined to kitchen sink use, although its greatest utility perhaps lies in such application.

A clear conception of one embodiment of the invention and of the manner in which devices constructed in accordance with the improvement may be operated, will be had by reference to the drawings accompanying and forming a part of this specification wherein like reference characters designate the same or similar parts in the various views.

Figure 1:
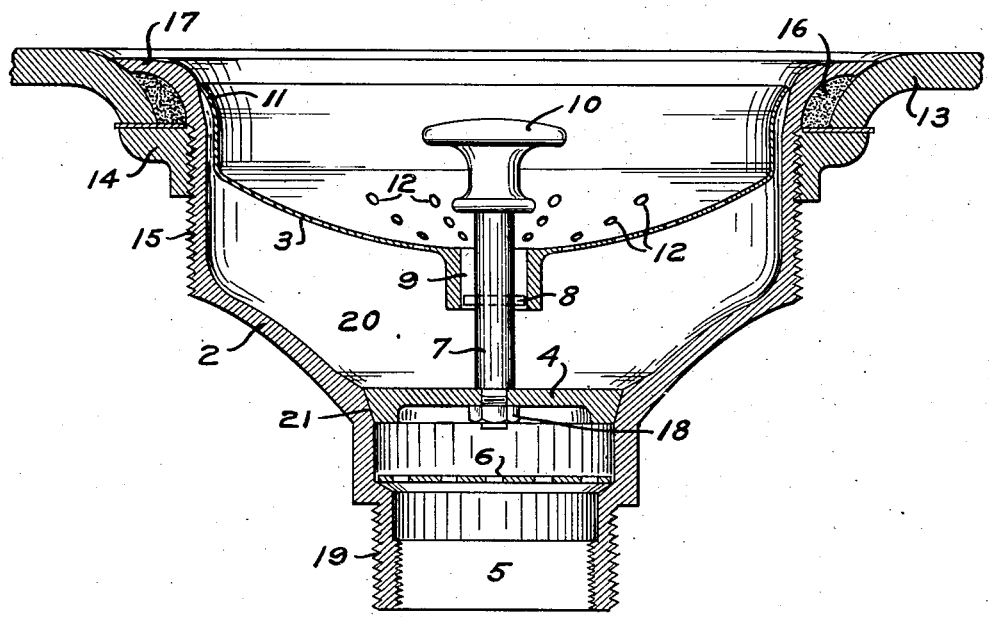
Fig. 1 is a central vertical section through the improved strainer, showing the same applied to a fragment of the bottom of a sink, and also showing the flow controlling stopper in closed position.

The improved sink strainer shown in the drawings, comprises in general a cup shaped shell or member 2 forming a pocket 20 and having an outlet 5 at the bottom thereof; a strainer or perforated receptacle 3 normally disposed within the pocket 20 but freely removable therefrom; and a valve plug or stopper 4 located within the pocket 20 at the discharge side of the receptacle, the stopper 4 being vertically adjustable to control the flow of liquid through the outlet 5. All of these elements of the strainer have circular horizontal cross section, and are preferably plated or enameled to present a neat appearance.

The pocket member 2 has an outwardly projecting flange 17 at its upper end which normally rests upon and is disposed substantially flush with the bottom 13 of a sink or the like, as shown in Fig. 1. The flange 17 is adapted to be forced into intimate engagement with the sink bottom 13 and with a mass of sealing or packing material 16 by means of a ring nut 14 coacting with external screw threads 15 of the member 2, thereby permanently attaching the member 2 to the sink and providing a leak proof joint. The lower portion of the pocket member 2 is also provided with external screw threads 19 for effecting attaching of the member 2 with the waste pipe in a well known manner. The interior of the member 2 directly above the outlet 5 has an annular tapered seating 21 for the stopper 4, and a secondary strainer plate 6 may be provided within the outlet 5 beyond the seating 21 for the purpose of preventing objectionable solids from reaching the waste pipe when the strainer receptacle 3 and the stopper 4 are removed.

Figure 3:
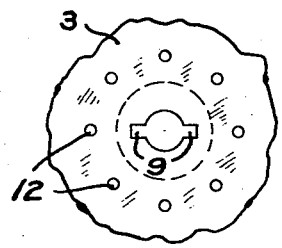
Fig. 3 is a top view of a fragment of the central portion of the strainer receptacle.

The strainer receptacle 3 is provided with an outwardly projecting annular flange 11 at its upper end which is adapted to rest loosely upon but in snug engagement with a strainer seat located intermediate the upper and lower ends of the pocket in the member 2 and preferably near the upper end of the pocket member 2. The bottom of the receptacle 3 is provided with drainage perforations 12, and the lower central or middle portion of the strainer bottom is further provided with a depending sleeve or hub having a vertical opening or hole 9 extending therethrough, this opening having one or more longitudinal grooves and being of the cross-section shown in Fig. 3.

The plug valve or stopper 4 disposed beneath the receptacle 2, is adapted to fit snugly within the seating 21 of the member 2, and is rigidly attached by means of a nut 18 to the lower end of a stem or rod 7 which extends upwardly through the opening 9 of the receptacle 3. The upper end of the rod 7 above the receptacle 3, is provided with an adjusting knob 10, and the medial portion of this rod is penetrated by a horizontal pin 8 which together with the adjoining portion of the rod 7 are freely vertically movable along and upwardly through and beyond the opening 9 and grooves of the receptacle 3.

Figure 2:
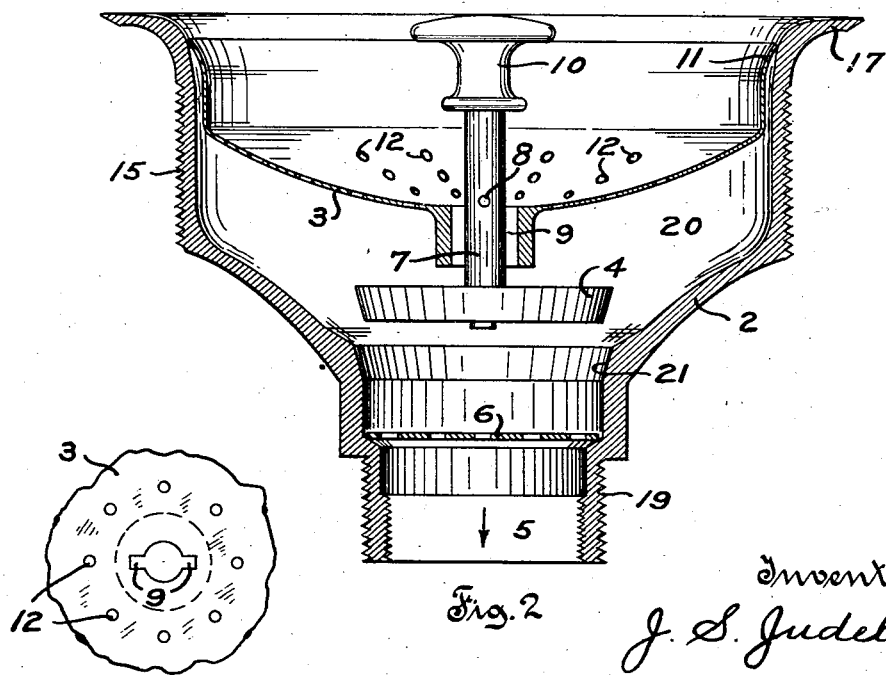
Fig. 2 is a central vertical section through the strainer, showing the flow controlling stopper in elevated or open position.

During normal use of the improved strainer, and assuming that the device has been properly applied to the sink bottom 13 as shown, the stopper 4 may be either dropped into the seating 21 as shown in Fig. 1, or raised to open the outlet 5 as shown in Fig. 2, with the aid of the knob 10 and without displacing the strainer basin 3 relative to the member 2. When the stopper 4 is closed no liquid is permitted to flow from the sink or from the pocket 20, and the transverse pin 8 is disposed within the lower portion of the opening 9 but does not pass beyond the lower end of this opening. In order to open the outlet 5, it is only necessary to lift the rod 7 by means of the knob 10 until the pin 8 has been moved upwardly beyond the upper end of the opening 9, and to release the knob 10 after giving the rod 7 a quarter turn, whereupon the pin 8 will come to rest upon the upper surface of the receptacle bottom as shown in Fig. 2 and will retain the stopper 4 in open position. Liquid is then free to flow from the sink through the receptacle 3, pocket 20 and outlet 5 to the waste pipe, and solids will be accumulated within the receptacle 3. In order to close the stopper 4 after the same has been positioned as shown in Fig. 2, it is only necessary to give the rod 7 a quarter turn, whereupon the stopper 4 will drop by gravity toward its seating 21.

When it becomes desirable to remove the strainer receptacle from within the pocket 20, it is only necessary to raise the knob 10. Initial upward movement of the knob 10 will raise the rod 7 and stopper 4, and the latter will eventually engage the lowermost surface of the receptacle 3, whereupon continued elevation of the stopper 4 will cause the receptacle 3 to be lifted freely out of the pocket 20. The elements thus removed may be readily cleaned and reinserted within the pocket 20 in an obvious manner.

From the foregoing description of the improved structure and of the mode of manipulating the same, it will be apparent that the present invention provides a strainer of the receptacle type wherein the stopper 4 may be readily adjusted to control the outlet 5 without moving the strainer receptacle 3. The stopper 4 and the receptacle 3 may however be simultaneously bodily removed from within the pocket 20 for cleaning purposes, and the secondary strainer plate 6 will prevent objectionable solids from reaching the waste pipe when the elements have been thus removed. By virtue of the fact that the receptacle 3 need not be raised in order to open the outlet 5, this receptacle may be of relatively shallow formation without sacrificing receptacle capacity, and the actuating knob 10 provides effective means for manipulating the elements without necessity of reaching into accumulated garbage or other solids within the receptacle 3. The member 2 and the strainer receptacle 3 are moreover devoid of objectionable projections which might tend to obstruct the flow and to permit accumulation of filth, and the crosspin 8 furnishes an effective means for maintaining the stopper 4 in open position. The entire structure is extremely simple and compact in construction, efficient in operation, and extremely neat in appearance.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:—

1. In combination, a member forming a pocket having maximum internal diameter at its upper end and having an outlet at the lower end thereof, a strainer disposed entirely within said pocket, said strainer being formed with a flange at its upper end resting directly upon the upper enlarged internal portion of said member and having a downwardly dished bottom provided at its lowermost portion with an opening located above said outlet, a stopper movable beneath the lowermost portion of said strainer to control said outlet, a rod secured to said stopper and freely movable longitudinally through and rotatable within said opening, and an abutment carried by said rod and cooperable with the bottom of said strainer to hold said stopper in open position, said abutment being formed to enter said opening during closing of said stopper.

2. In combination, a member forming a pocket having a tapered portion of maximum internal diameter at its upper end and having an outlet at the lower end thereof, a strainer disposed entirely within said pocket, said strainer having a tapered upper outer portion resting directly upon said tapered pocket portion and having a downwardly dished bottom provided at its lowermost portion with an opening located above said outlet, a stopper movable beneath the lowermost portion of said strainer to control said outlet, a rod secured to said stopper and movable longitudinally through and rotatable within said opening, and an abutment carried by said rod and cooperable with the lowermost internal portion of said strainer to hold said stopper in open position, said abutment being movable within said opening during closing of said stopper.

3. A waste fitting for sinks and the like, comprising a shell or bushing having a strainer seat intermediate its upper and lower ends and a stopper seat below said strainer seat, a perforated strainer engaging said strainer seat and having at its middle portion a sleeve provided with interior longitudinal grooves, a stopper to engage said stopper seat, a stem secured to said stopper and projecting upwardly through said sleeve, and lateral projections on said stem adapted to move through said grooves, said stem and strainer being relatively turnable to move said projections out of registry with said grooves.

4. A waste fitting for sinks and the like, comprising a one piece member forming a pocket having a strainer seat intermediate its upper and lower ends and also having a stopper seat below said strainer seat and having an integral downwardly projecting central sleeve provided with an internal longitudinal groove, a stopper engageable with said stopper seat and having a stem projecting upwardly through said sleeve, and a lateral projection on said stem adapted to move through said groove, said stem and strainer being relatively turnable to move said projection out of registry with said groove.

5. A waste fitting for sinks and the like, comprising a member forming a pocket having a strainer seat intermediate its upper and lower ends and also having a stopper seat below said strainer seat, a strainer engaging said strainer seat and having a central sleeve provided with a longitudinal groove exposed to the interior of the sleeve, a stopper engageable with said stopper seat and having a stem projecting upwardly through said sleeve, and a projection on said stem adapted to move along said groove, said stem and strainer being relatively turnable to move said projection out of registry with said groove.

In testimony whereof the signature of the inventor is affixed hereto.

JULIUS S. JUDELL.